(12) United States Patent
Canacik et al.

(10) Patent No.: US 8,360,770 B2
(45) Date of Patent: Jan. 29, 2013

(54) FUEL PREHEATING SYSTEM

(75) Inventors: Arif Canacik, Kozyatagi (TR); Ahmet Donmez, Kozyatagi (TR)

(73) Assignee: Yenbu Makine Sanayi Ve Ticaret A.S., Istanbul (TR)

( * ) Notice: Subject to any disclaimer, the term of this patent is extended or adjusted under 35 U.S.C. 154(b) by 306 days.

(21) Appl. No.: 12/645,428

(22) Filed: Dec. 22, 2009

(65) Prior Publication Data

US 2010/0167221 A1    Jul. 1, 2010

(30) Foreign Application Priority Data

Dec. 26, 2008    (TR) ................................ 2008/09852

(51) Int. Cl.
*F23D 11/44*    (2006.01)

(52) U.S. Cl. ............ 431/207; 431/11; 431/161; 431/215

(58) Field of Classification Search .................. 431/207, 431/11, 161, 215; 432/179
See application file for complete search history.

(56) References Cited

U.S. PATENT DOCUMENTS

| | | | |
|---|---|---|---|
| 2,599,480 A | 6/1952 | Pfenninger | |
| 2,700,380 A | 1/1955 | Knight | |
| 3,291,191 A | 12/1966 | Stoops | |
| 3,480,416 A | 11/1969 | Stoops et al. | |
| 3,762,385 A | 10/1973 | Hollnagel | |
| 3,844,270 A * | 10/1974 | Black | 126/110 R |
| 3,859,040 A | 1/1975 | Shefsiek et al. | |
| 4,047,881 A | 9/1977 | Eschenauer et al. | |
| 4,174,943 A | 11/1979 | Reed | |
| 4,310,303 A | 1/1982 | Collier | |
| 4,323,043 A | 4/1982 | Alderson | |
| 4,329,842 A | 5/1982 | Hoskinson | |
| 4,343,283 A | 8/1982 | Shepherd | |
| 4,367,718 A | 1/1983 | Heine | |
| 4,452,586 A | 6/1984 | Voges | |
| 4,516,556 A | 5/1985 | Meyer | |
| 4,562,336 A | 12/1985 | Heimler | |
| 5,011,670 A | 4/1991 | Davis et al. | |
| 5,197,447 A | 3/1993 | Dick | |
| 5,280,776 A | 1/1994 | Dick | |
| 5,413,477 A | 5/1995 | Moreland | |
| 5,725,366 A | 3/1998 | Khinkis et al. | |
| 5,794,601 A | 8/1998 | Pantone | |
| 6,126,438 A | 10/2000 | Joshi et al. | |

(Continued)

FOREIGN PATENT DOCUMENTS

| | | |
|---|---|---|
| EP | 0019421 A2 | 11/1980 |
| EP | 0019421 A3 | 1/1981 |

(Continued)

OTHER PUBLICATIONS

International search report and written opinion dated Feb. 11, 2011 for PCT Application No. IB2009/007979.

(Continued)

*Primary Examiner* — Alfred Basichas
(74) *Attorney, Agent, or Firm* — Wilson Sonsini Goodrich & Rosati

(57) ABSTRACT

The present invention provides fuel saving systems. Fuel consumption can be reduced by 5% to 40% or more by pre-combustion heating the fuels. The heat exhaust of a combustion chamber can be used to heat a heat transfer fluid, which exchanges heat with the incoming fuel stream.

45 Claims, 6 Drawing Sheets

U.S. PATENT DOCUMENTS

| | | |
|---|---|---|
| 6,139,315 A | 10/2000 | Berglund et al. |
| 6,167,692 B1 | 1/2001 | Anand et al. |
| 6,381,945 B2 | 5/2002 | Werner |

FOREIGN PATENT DOCUMENTS

| | | |
|---|---|---|
| EP | 0042454 A1 | 12/1981 |
| EP | 0635673 A1 | 1/1995 |
| EP | 2009257 A1 | 12/2008 |
| GB | 837500 | 6/1960 |
| WO | WO2008/071008 A1 | 6/2008 |

OTHER PUBLICATIONS

U.S. Department of Energy. Energy Tips—Process heating. Preheated combustion air. Process Heating Tip Sheet # 1, Nov. 2007.

Wikipedia definition—Recuperator. Available at http://en.wikipedia.org/wiki/Recuperator. Accessed Nov. 9, 2009.

Wikipedia definition—Regenerative heat exchanger. Available at http://en.wikipedia.org/wiki/Regenerator_thermal_oxidizer. Accessed Nov. 9, 2009.

Wikipedia definition—Regenerative thermal oxidizer. Available at http://en.wikipedia.org/wiki/Regenerative_thermal_oxidizer. Accessed Nov. 9, 2009.

Zhukov, et al. Preheating Natural Gas for Heating Open-Hearth Furnaces. Metallurg. May 1977; No. 5, pp. 23-24. Translated from Metallurg, No. 5, pp. 23-24, May 1977.

\* cited by examiner

FUEL PREHEATING SYSTEM

CROSS-REFERENCE

This application claims the benefit of Turkish Patent Application 2008/09852 filed on Dec. 26, 2008, which application is incorporated herein by reference in its entirety.

BACKGROUND OF THE INVENTION

Industrial and consumer applications commonly use fossil fuels to create energy. Fossil fuel derived gases can be referred to as natural gas, which comprises a gas consisting primarily of methane. It is found associated with fossil fuels, in coal beds, as methane clathrates, and is created by methanogenic organisms in marshes, bogs, and landfills. It is an important fuel source, a major feedstock for fertilizers, and a potent greenhouse gas.

Natural gas is a major source of electricity generation through the use of gas turbines and steam turbines. Most grid peaking power plants and some off-grid engine-generators use natural gas. Particularly high efficiencies can be achieved through combining gas turbines with a steam turbine in combined cycle mode. Natural gas burns more cleanly than other fossil fuels, such as oil and coal, and produces less carbon dioxide per unit energy released. For an equivalent amount of heat, burning natural gas produces about 30% less carbon dioxide than burning petroleum and about 45% less than burning coal. Combined cycle power generation using natural gas is thus the cleanest source of power available using fossil fuels, and this technology is widely used wherever gas can be obtained at a reasonable cost.

At the current state of the technology, natural gas is transferred to its final destination of use in gas form by means of pipes or pressure resistant tankers or in liquid form again in pressure resistant tankers. Gases that are transferred under high pressure by means of pipes or tankers from their production points are reduced in pressure at pressure reducing stations and then delivered to the end user. Valves and security equipment are used in order to ensure the security of the stations and impede the back charge of the gas.

Extraction, production and transportation from long distances by means of pipes or pressure resistant tankers are a costly process. In many systems, the gas delivered to the end user by pipes enters into the combustion chamber at the delivery temperature, which can vary according to geography, season, transfer method and storage location.

The present invention provides fuel savings and enhanced efficiency of many kinds of combustible fuels, including without limitation natural gas, liquefied petroleum gas (LPG), Liquefied natural gas (LNG), compressed natural gas (CNG), cold compressed natural gas (CCNG), etc. Fuel consumption can be reduced by 5% to 40% or more by pre-combustion heating of the fuels.

SUMMARY OF THE INVENTION

In one aspect, the present invention provides a system comprising: a heating chamber configured and arranged to heat a fuel; a combustion chamber fluidly connected to the heating chamber, wherein the combustion chamber is configured and arranged to receive the fuel heated in the heating chamber and to combust the fuel therein; and a heat exchange element, wherein the heat exchange element is configured to transfer exhaust heat generated by the combustion chamber to the heating chamber.

In some embodiments, the system is constructed and arranged such that exhaust heat is transferred to the heating chamber using a heat transfer fluid. In some embodiments, the heating chamber comprises: an inlet for the heat transfer fluid; a pipe constructed and arranged to transport the heat transfer fluid; an outlet for the heat transfer fluid; and a fuel flow pipe constructed and arranged to allow heat exchange between the fuel and the heat transfer fluid. The heating chamber can comprise a number of shapes, including without limitation a cylindrical, triangular prism, or rectangular prism shape. In some embodiments, the heat transfer fluid flows through a spiral heating pipe inside the heating chamber. The fuel flow pipe may have internal baffles, e.g., to provide turbulent flow to more evenly heat the fuel flowing therein.

In some embodiments, the system is configured and arranged such that a portion of the fuel is not preheated before entering the combustion chamber. In some embodiments, the systems of the invention further comprise an exhaust chimney in fluidic communication with the combustion chamber. The temperature inside the exhaust chimney can be monitored. These configurations can be used to control the temperature of the fuel entering combustion chamber to an optimal level.

In some embodiments, the systems of the invention further a pool system constructed and arranged to reduce the flow of the heat transfer fluid to the heating chamber. For example, the heat transfer fluid can be diverted to the pool system to reduce its flow. The pool system can be engaged to reduce the flow of the heat transfer fluid to the heating chamber when the fuel supply decreases or when the temperature of the fuel entering the combustion chamber exceeds the desired level.

The system of the invention can also comprise a transfer apparatus to provide positive force to circulate the heat transfer fluid. Such apparatus can comprise pumps, valves, and combinations thereof.

In another aspect, the present invention provides a system comprising: a) a heating chamber configured and arranged to heat a fuel, wherein the heating chamber comprises: i) an inlet for a heat transfer fluid; ii) a pipe constructed and arranged to transport the heat transfer fluid; iii) an outlet for the heat transfer fluid; and iv) a fuel flow pipe constructed and arranged to allow heat exchange between the fuel and the heat transfer fluid, wherein the fuel flow pipe optionally comprises internal baffles; b) a combustion chamber fluidly connected to the heating chamber, wherein the combustion chamber is configured and arranged to receive the fuel heated in the heating chamber and to combust the fuel therein; c) a heat exchange element, wherein the heat exchange element is configured to transfer exhaust heat generated by the combustion chamber exhaust to the heating chamber using the heat transfer fluid; d) a transfer apparatus to provide positive force to circulate the heat transfer fluid; and e) optionally comprising a pool system constructed and arranged to reduce the flow of the heat transfer fluid to the heating chamber when the fuel supply decreases or when the temperature of the fuel entering the combustion chamber exceeds the desired level. In some embodiments, the heat transfer fluid comprises a mineral oil of formula $C_{12}H_{26}$—$C_{16}H_{34}$ and the fuel comprises natural gas, liquefied petroleum gas (LPG), liquefied natural gas (LNG), or compressed natural gas (CNG).

In any of the systems of the invention, the heat transfer fluid may comprise a gas phase. In some embodiments, the gas phase heat transfer fluid comprises air, hydrogen, inert gases, helium, nitrogen, carbon dioxide, sulfur hexafluoride, steam or a combination thereof.

In any of the systems of the invention, the heat transfer fluid may comprise a liquid phase. In some embodiments, the liquid phase heat transfer fluid comprises water, highly pure deionized water, heavy water, antifreeze, ethylene glycol, diethylene glycol, or propylene glycol, betaine, polyalkylene glycol, oil, mineral oil, castor oil, silicone oil, fluorocarbon oil, transformer oil, nanofluids or a combination thereof. In some embodiments, the heat transfer fluid comprises a mineral oil, e.g., a paraffin mineral oil of formula $C_{12}H_{26}$—$C_{16}H_{34}$.

The fuel entering the systems of the invention may comprise a liquid fuel, a gas fuel, or a combination thereof. In some embodiments, the fuel entering the systems comprises a gasoline, jet fuel, natural gas, liquefied petroleum gas (LPG), liquefied natural gas (LNG), compressed natural gas (CNG), naphtha, propane, diesel, heating oil, kerosene, fuel oil, distillate fuel oil, diesel fuel oil, light fuel oil, residual fuel oil, heavy fuel oil, gasoil, bunker fuel, alcohol fuel, E85, ethanol fuel, ethanol fuel mixtures, biodiesel, biogas, or a combination thereof. In some embodiments, the fuel comprises natural gas, liquefied petroleum gas (LPG), liquefied natural gas (LNG), or compressed natural gas (CNG).

The systems of the invention can be configured and arranged to be retrofit to a preexisting fuel burning system. The systems can also be incorporated into a novel fuel burning system.

Some embodiments of the systems of the invention comprise a valve to regulate the pressure of the fuel and/or impede a back flow of the fuel. Some embodiments also comprise a pressure reducing station, wherein the pressure reducing station is configured to reduce the pressure of the fuel before the fuel enters the heating chamber. Some embodiments comprise a volume increasing station, wherein the volume increasing station is configured to increase the volume of the fuel before the fuel enters the heating chamber. Such arrangements may be used, e.g., to expand a liquid fuel to a gas phase, e.g., a liquid natural gas to natural gas.

In any of the systems of the invention, the systems can be constructed and arranged such that at least a portion of a combustion air is preheated before entering the combustion chamber. In addition, the fuel may be heated by an additional heat source.

In some embodiments, the systems of the invention comprise one or more of a Britalus rotary engine, Coomber rotary engine, free-piston engine, gas turbine, aeroderivative, turbojet, jet engine, auxiliary power unit, industrial gas turbine, turboshaft engine, radial gas turbine, micro-jet, microturbine, external combustion engine, rotary turbine, internal combustion engine, Internally Radiating Impulse Structure (Iris) engine, turbofan engine, rocket engine, ramjet engine, Minto wheel, orbital engine, Sarich orbital engine, reciprocating engine, piston engine, quasiturbine engine (Quirbines), pistonless rotary engine, rotary combustion engine, RotationsKolbenMaschinen (RKM) engine, Trochilic engine, Engineair engine, Rand cam engine, Atkinson cycle engine, liquid-piston engine, Gerotor engine, split-single engine (twingles), steam engine, reciprocating steam engine, beam engine, stationary steam engine, boiler, multiple expansion engine, uniflow engine, steam turbine, noncondensing turbine, backpressure turbine, condensing turbine, reheat turbine, extracting turbine, Stirling engine, swing-piston engine, oscillating piston engine, vibratory engine, toroidal engine, Tschudi engine, and a Wankel engine. The invention can be used to provide fuel savings with these or other fuel burning engines.

In some embodiments, the systems of the invention are constructed and arranged such that the fuel is heated in the heating chamber by at least about 1° C., 2° C., 3° C., 4° C., 5° C., 6° C., 7° C., 8° C., 9° C., 10° C., 12° C., 15° C., 20° C., 25° C., 30° C., 35° C., 40° C., 45° C., 50° C., 55° C., 60° C., 65° C., 70° C., 75° C., 80° C., 90° C., 95° C., 100° C., 110° C., 120° C., 125° C., 130° C., 140° C., 150° C., 160° C., 170° C., 175° C., 180° C., 190° C., 200° C., 225° C., 250° C., 275° C., 300° C., 325° C., 350° C., 375° C., 400° C., 425° C., 450° C., 475° C., 500° C., 525° C., 550° C., 575° C., 600° C., 625° C., 650° C., 675° C., 700° C., 725° C., 750° C., 775° C., 800° C., 825° C., 850° C., 875° C., 900° C., 925° C., 950° C., 975° C., or at least about 1000° C. The optimal fuel preheating can be determined for each deployed system.

In some embodiments, the systems of the invention are constructed and arranged such that the fuel is heated in the heating chamber so that it enters the combustion chamber at about 1° C., 2° C., 3° C., 4° C., 5° C., 6° C., 7° C., 8° C., 9° C., 10° C., 12° C., 15° C., 20° C., 25° C., 30° C., 35° C., 40° C., 45° C., 50° C., 55° C., 60° C., 65° C., 70° C., 75° C., 80° C., 90° C., 95° C., 100° C., 110° C., 120° C., 125° C., 130° C., 140° C., 150° C., 160° C., 170° C., 175° C., 180° C., 190° C., 200° C., 225° C., 250° C., 275° C., 300° C., 325° C., 350° C., 375° C., 400° C., 425° C., 450° C., 475° C., 500° C., 525° C., 550° C., 575° C., 600° C., 625° C., 650° C., 675° C., 700° C., 725° C., 750° C., 775° C., 800° C., 825° C., 850° C., 875° C., 900° C., 925° C., 950° C., 975° C., or about 1000° C. The optimal fuel preheating can be determined for each deployed system.

In some embodiments, the systems of the invention are constructed and arranged such that the increased fuel efficiency provided by the system are at least about 1%, 2%, 3%, 4%, 5%, 6%, 7%, 8%, 9%, 10%, 12%, 15%, 20%, 25%, 30%, 35%, 40%, 45%, 50%, 55%, 60%, 65%, 70%, 75%, 80%, 90%, 95%, 100%, 110%, 120%, 125%, 130%, 140%, 150%, 160%, 170%, 175%, 180%, 190%, 200%, 225%, 250%, 275%, 300%, 325%, 350%, 375%, 400%, 425%, 450%, 475%, 500%, 525%, 550%, 575%, 600%, 625%, 650%, 675%, 700%, 725%, 750%, 775%, 800%, 825%, 850%, 875%, 900%, 925%, 950%, 975%, or at least about 1000%.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
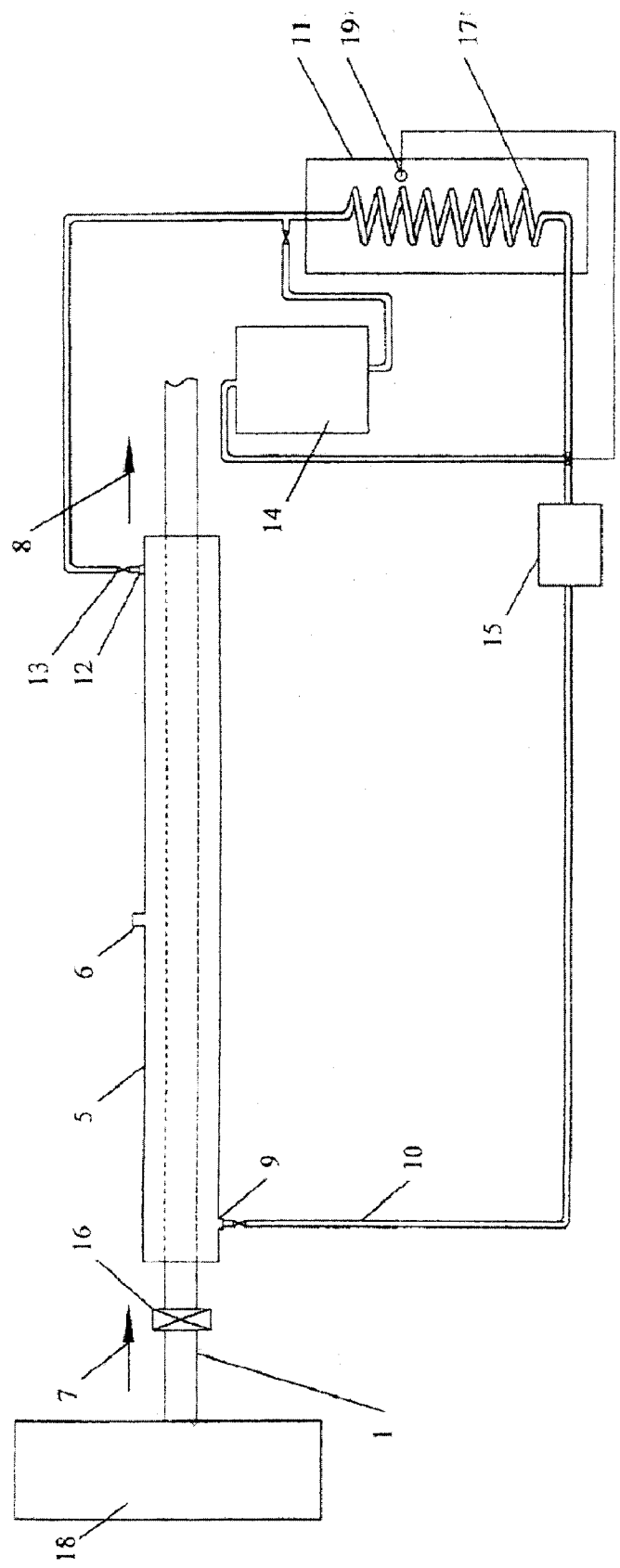
FIG. 1 illustrates a system view used in the implementation of the invention.

The present invention provides fuel savings. The systems of the invention preheat fuels prior to combustion, thereby increasing fuel efficiency and reducing consumption. The components of the system are mounted prior to the combustion chamber. For fuels that are expanded, e.g., natural gas, the components can be mounted after the pressure decreasing station. The systems of the invention can be retrofit to preexisting fuel systems without damaging the infrastructure. For example, the systems can be retrofit to preexisting turbine engines, gas engines, internal combustion engines, external combustion engines, boilers and the like. In other embodiments, the invention is incorporated into energy producing systems at the design stage.

According to Charles' law, also known as the law of volumes, gases tend to expand when heated. The law states that at constant pressure, the volume of a given mass of an ideal gas increases or decreases by the same factor as its temperature on the absolute temperature scale (i.e. the gas expands as the temperature increases). The coefficient of expansion is about the same for all the common gases at ordinary temperatures; it is $1/273$ of the volume at 0° C. per degree rise in temperature. Conversely, when a gas is heated while maintaining the volume, the pressure increases. The systems of the invention take advantage of these principles by preheating the fuel prior to combustion to improve fuel efficiency. Whereas preheating combustion air can concomitantly increase noxious emissions, preheating the fuel input may not increase such emissions and may lower the emissions, e.g., by reducing the amount of fuel burned.

The present invention provides fuel saving and enhanced efficiency of many kinds of gas fuels, including without limitation natural gas, liquefied petroleum gas (LPG), Liquefied natural gas (LNG), compressed natural gas (CNG), cold compressed natural gas (CCNG), etc. The principles of the system can also be applied to systems using oil or other fuels and petroleum products, e.g., light oil, light oil/natural gas, heavy oil, diesel, gasoline or other fuel burning systems. The principles can be applied in a variety of industrial and personal settings, e.g., to steam boilers, turbines, home appliances, household type boilers and the like. Various types of fuel burning heat engine can take advantage of the systems of the invention. Such engines include without limitation Britalus rotary engines, Coomber rotary engines, free-piston engines, gas turbines, aeroderivatives, turbojets, jet engines, auxiliary power units, industrial gas turbines, turboshaft engines, radial gas turbines, micro-jets, microturbines, external combustion engines, rotary turbines, internal combustion engines, Internally Radiating Impulse Structure (Iris) engines, turbofan engines, rocket engines, ramjet engines, Minto wheels, orbital engines, Sarich orbital engines, reciprocating engines, piston engines, quasiturbine engines (Quirbines), pistonless rotary engines, rotary combustion engines, RotationsKolben-Maschinen (RKM) engines, Trochilic engines, Engineair engines, Rand cam engines, Atkinson cycle engines, liquid-piston engines, Gerotor engines, split-single engines (twingles), steam engines, reciprocating steam engines, beam engines, stationary steam engine, boilers, multiple expansion engines, uniflow engines, steam turbine, noncondensing turbines, backpressure turbines, condensing turbines, reheat turbines, extracting turbines, Stirling engines, swing-piston engines, oscillating piston engines, vibratory engines, toroidal engines, Tschudi engines, and Wankel engines. One of skill in the art will appreciate that the systems can be used in any appropriate setting wherein a fuel is subjected to combustion. The efficiency gains will depend on each particular system.

Commercial fuels that can be used with the systems of the invention include without limitation gasoline, jet fuel, natural gas, naphtha, propane, diesel, heating oil, kerosene, fuel oils, distillate fuel oils, diesel fuel oils, light fuel oils, residual fuel oils, heavy fuel oils, gasoil, bunker fuel, and renewable fuels such as alcohol fuel, E85, ethanol fuel and mixtures thereof, biodiesel and biogas.

Liquefied natural gas (LNG) is natural gas that has been converted temporarily to liquid form for ease of storage or transport. Liquefied natural gas takes up about $1/600$th the volume of natural gas in the gaseous state. The natural gas is purified of certain impurities then condensed into a liquid at close to atmospheric pressure by cooling to approximately −162° C. LNG is principally used for transporting natural gas to markets, where it is regasified and distributed as pipeline natural gas.

Compressed natural gas (CNG) is made by compressing natural gas, to less than 1% of its volume at standard atmospheric pressure. It is stored and distributed in hard containers, at a normal pressure of 200-220 bar (2900-3200 psi), usually in cylindrical or spherical shapes. CNG is used in traditional gasoline internal combustion engine cars that have been converted into bi-fuel vehicles (gasoline/CNG).

Liquefied petroleum gas (LPG) is a mixture of hydrocarbon gases used as a fuel in heating appliances and vehicles. LPG includes mixes that are primarily propane, mixes that are primarily butane, and mixes including both propane and butane. Propylene and butylenes can also be present in small concentration. LPG is synthesized by refining petroleum or 'wet' natural gas, and is usually derived from fossil fuel sources. It can be manufactured during the refining of crude oil, or extracted from oil or gas streams as they emerge from the ground. LPG is supplied in pressurized steel containers.

In some embodiments, the systems of the invention heat the fuel in heating chamber. Any appropriate heating methods may be used. These include without limitation electrical energy, solar energy, hot steam, hot liquid, or combinations thereof.

In one embodiment, the heat provided to the incoming gas is recycled from the exhaust heat or flue gas of the combustion chamber. For example, the incoming fuel or a portion thereof, can absorb heat through a heat exchange with the exhaust gas. Fuels can be mixed or combined with an oxygen source prior to combustion. A common source of combustion air is atmospheric air. In some embodiments, some or all of the combustion air is also preheated prior to combustion using the same or different source of heat than the preheated fuel.

The fuel savings produced by the system can be dependent on the temperature to which the fuel is heated prior to combustion. Control systems can be used so that the fuel is heated to a particular temperature for each application. For example, when the fuel reaches a certain preheated temperature, the heat exchange can be reduced by any number of methods. For example, a portion of the fuel can be diverted so that it does not enter the heat exchanger. Or the flow rate or volume of hot air or liquid in the heat exchanger can be reduced. When natural gas or other fuels are expanded prior to combustion, the temperature of the gas can drop with the reduction in pressure. In these cases, the fuel can be preheated prior to or after the expansion step, or both before and after expansion.

The fuel can be preheated before combustion by about 1° C., 2° C., 3° C., 4° C., 5° C., 6° C., 7° C., 8° C., 9° C., 10° C., 12° C., 15° C., 20° C., 25° C., 30° C., 35° C., 40° C., 45° C., 50° C., 55° C., 60° C., 65° C., 70° C., 75° C., 80° C., 90° C., 95° C., 100° C., 110° C., 120° C., 125° C., 130° C., 140° C., 150° C., 160° C., 170° C., 175° C., 180° C., 190° C., 200° C., 225° C., 250° C., 275° C., 300° C., 325° C., 350° C., 375° C., 400° C., 425° C., 450° C., 475° C., 500° C., 525° C., 550° C., 575° C., 600° C., 625° C., 650° C., 675° C., 700° C., 725° C., 750° C., 775° C., 800° C., 825° C., 850° C., 875° C., 900° C., 925° C., 950° C., 975° C., or about 1000° C. In some embodiments, the fuel is preheated by more than about 1000° C.

The fuel can be preheated before combustion to about 5° C., 10° C., 15° C., 20° C., 25° C., 30° C., 35° C., 40° C., 45° C., 50° C., 55° C., 60° C., 65° C., 70° C., 75° C., 80° C., 90° C., 95° C., 100° C., 110° C., 120° C., 125° C., 130° C., 140° C., 150° C., 160° C., 170° C., 175° C., 180° C., 190° C., 200° C., 225° C., 250° C., 275° C., 300° C., 325° C., 350° C., 375° C., 400° C., 425° C., 450° C., 475° C., 500° C., 525° C., 550° C., 575° C., 600° C., 625° C., 650° C., 675° C., 700° C., 725° C., 750° C., 775° C., 800° C., 825° C., 850° C., 875° C., 900° C., 925° C., 950° C., 975° C., or 1000° C. In some embodiments, the fuel is preheated by more than 1000° C.

In one embodiment, the invention preheats the fuel and/or combustion air prior to combustion by using heat exchange with the hot flue gas. A number of types of heat exchangers can be used in the systems of the invention. These include without limitation shell and tube heat exchangers, plate heat exchangers, regenerative heat exchangers, recuperative heat exchangers, adiabatic wheel heat exchangers, plate fin heat exchangers, fluid heat exchangers, waste heat recovery units, dynamic scraped surface heat exchanger, phase-change heat exchangers, spiral heat exchangers, or a combination thereof. The fuel and combustion air can be preheated using different or the same type of exchanger. In some embodiments, the fuel and combustion air, or a portion of either, are premixed then preheated prior to combustion. In some embodiment, the heat exchanger is a direct heat exchanger. Direct contact heat exchangers involve heat transfer between hot and cold streams of two phases in the absence of a separating wall.

In some embodiments, the heat exchange is via an indirect heat exchanger. FIG. 1 depicts an exemplary embodiment of the invention wherein the fuel is preheated by passing a heat transfer fluid through the flue exhaust to absorb heat. Heat from the hot heat transfer fluid is then exchanged with the fuel in heating chamber 5.

Figure 2:
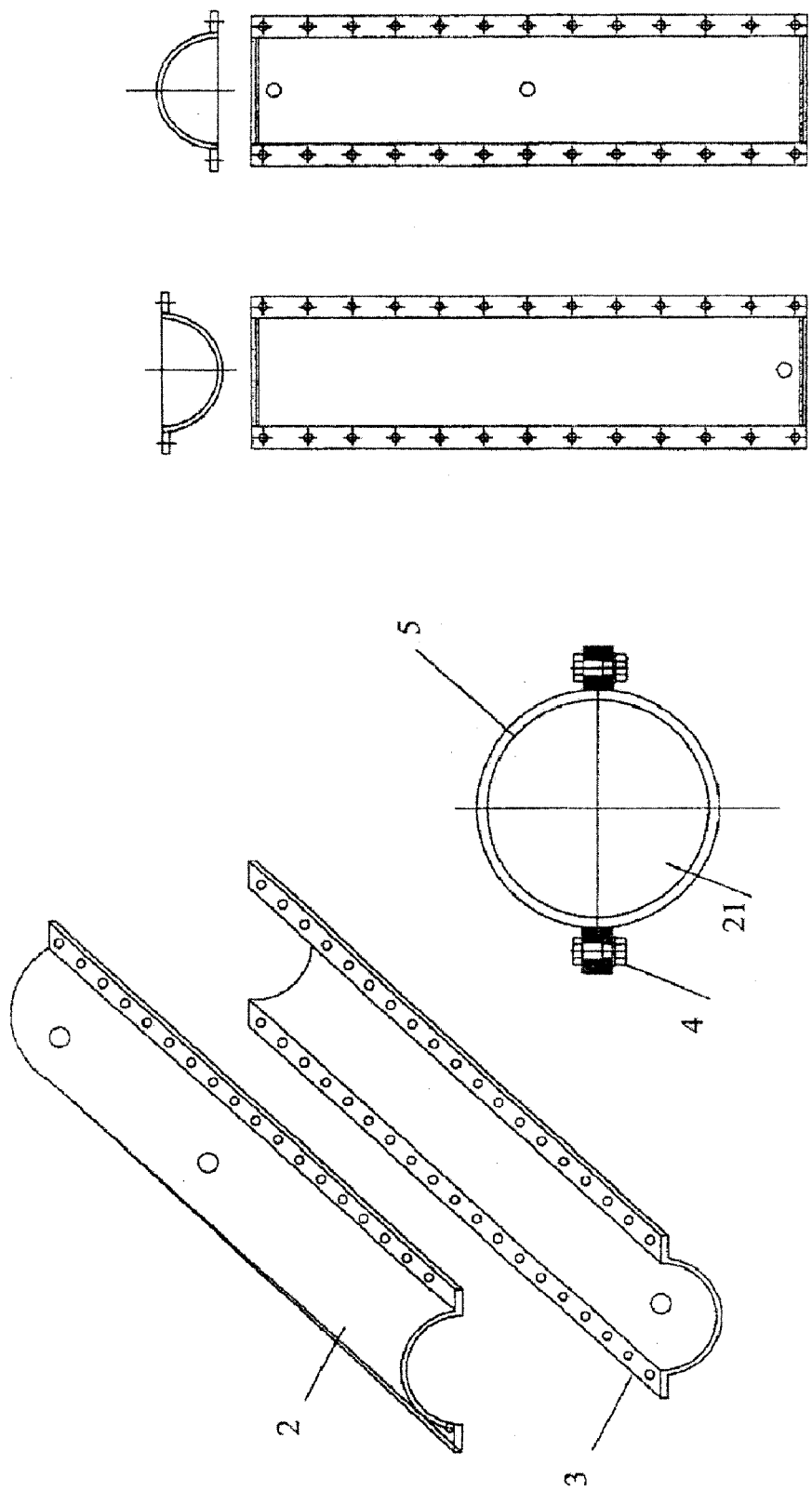
FIG. 2 illustrates a perspective view of the heating chamber parts used in an implementation of the invention.

As shown in FIG. 2, heating chamber 5 comprises of a bottom part 2 and a top part 3. Seal 21 serves to prevent leaks. Gas fuel flow pipe 1 with at least one entrance 7 and at least one exit 8 passes from pressure reducing or volume expanding station 18 through heating chamber 5. Heating chamber components 2 and 3 are mounted together with bolts 4 and the heating chamber 5 is mounted on the gas flow pipe 1 by completely covering it at the selected section. These two sections allow heating chamber 5 to be retrofit to a preexisting system. Heating chamber 5 can be configured to have different sizes and shapes depending on the particular system. For example, when the system is used in a retrofit design, heating chamber 5 can be configured and adapted for the preexisting piping carrying the fuel to the combustion chamber. In some embodiments, heating chamber 5 comprises a cylindrical shape, rectangular prism, triangular prism, or has varying shapes along its length. Any appropriate shape can be used given the energy producing system at hand. The fluid inlet 6 typically resides on the top of heating chamber 5. Before the system starts operation, heating chamber 5 can be filled with the heat transfer fluid at fluid inlet 6. The addition of the heat transfer fluid to the system can be a onetime operation and can be performed right after the system installation and before the first running of the system. Before the combustion chamber is started, the heat transfer fluid can be cool, e.g., at room temperature, or can be preheated using an external heat source (electrical, thermal, solar, etc).

The heat transfer fluid exits heating chamber 5 from fluid drain 9 and passes through heat transfer fluid pipe 10. The heat transfer fluid has reduced temperature at drain 9 relative to its temperature at inlet 6 due to heat exchange with the cooler fuel. Heat transfer fluid pipe 10 can be constructed of copper or other appropriate piping material. The heating fluid travels through heat transfer fluid pipe 10 where it reaches the exhaust chimney 11 to be reheated by heat exchange with the flue gas. The temperature at exhaust chimney 11 depends on the conditions of the fuel combustion system and can range from, e.g., 100° C. to 300° C. and above. In some embodiments, the temperature is above 100° C., 110° C., 120° C., 125° C., 130° C., 140° C., 150° C., 160° C., 170° C., 175° C., 180° C., 190° C., 200° C., 225° C., 250° C., 275° C., 300° C., 325° C., 350° C., 375° C., 400° C., 425° C., 450° C., 475° C., 500° C., 525° C., 550° C., 575° C., 600° C., 625° C., 650° C., 675° C., 700° C., 725° C., 750° C., 775° C., 800° C., 825° C., 850° C., 875° C., 900° C., 925° C., 950° C., 975° C., 1000° C., 1500° C., 2000° C., 2500° C. or above about 3000° C. In some embodiments, heat transfer fluid pipe 10 is positioned directly within the chimney 11. As shown in the figure, this section of transfer pipe 10 can be spiral shaped to increase the heating surface and thereby allow the heat transfer fluid which enters exhaust chimney 11 to absorb more heat. Hot fluid exiting the exhaust chimney 11 travels through heat transfer fluid pipe 10 and enters heating chamber 5 through fluid inlet 12. Valve 13 at the heated fluid inlet can be used to release pressure and air as necessary.

Heat is transferred in heating chamber 5 from the heat transfer fluid to the fuel flowing in a countercurrent arrangement through fuel pipe 1. In some embodiments, the system can be constructed and arranged so that the heat transfer fluid and fuel flow in a concurrent arrangement. During this heat transfer, the fuel flowing through the fuel pipe 1 is heated as it traverses heating chamber 5. Conversely, the heat transfer fluid is cooled during the heat transfer as it heats the fuel flowing through fuel pipe 1. The heat transfer fluid flows back into heat transfer fluid pipe 10 after passing through fluid drain 9 at bottom part 2. The heat transfer fluid repeats the above procedure with a continuous cycle, thereby continuously heating the fuel flowing through fuel pipe 1 towards the combustion chamber. Transfer apparatus 15 can be comprised of pumps and the like to provide a positive flow of the heat transfer fluid through the system.

In some embodiments, pool system 14 is used. Pool system 14 can be put into operation when fuel flow into the system is interrupted or when the temperature of the heat transfer fluid exiting exhaust chimney 11 exceeds the desired value for the system at hand. In this manner, the system can prevent overheating the fuel before it enters the combustion chamber. Various components can be used to measure the temperature of the heat transfer fluid exiting from within exhaust chimney 11. In one embodiment, the temperature of the exhaust chimney 11 is measured by thermometer 19 placed inside the chimney 11. In another embodiment, the temperature of the heat transfer fluid itself is measured. Multiple temperature measurements can be made at various points of the system as desired. If the temperature of the exhaust flue gas and/or heat transfer fluid leaving exhaust chimney 11 falls below and/or rises above the desired temperature, the valve on transfer apparatus 15 positioned on transfer pipe 10 can be closed so that the flow of the heat transfer fluid is reduced, thereby reducing the amount of heat carried by the heat transfer fluid entering heating chamber 5.

When the fuel flow is interrupted, pool system 14 can stop the heating system from functioning and prevent the remaining fuel in fuel pipe 1 from being heated. In another embodiment, transfer apparatus 15 can transfer the heat transfer fluid in heat transfer fluid pipe 10 to exhaust chimney 11. One of skill in the art will appreciate that transfer apparatus 15 can be comprised of pumps and valves as appropriate.

Figure 3:
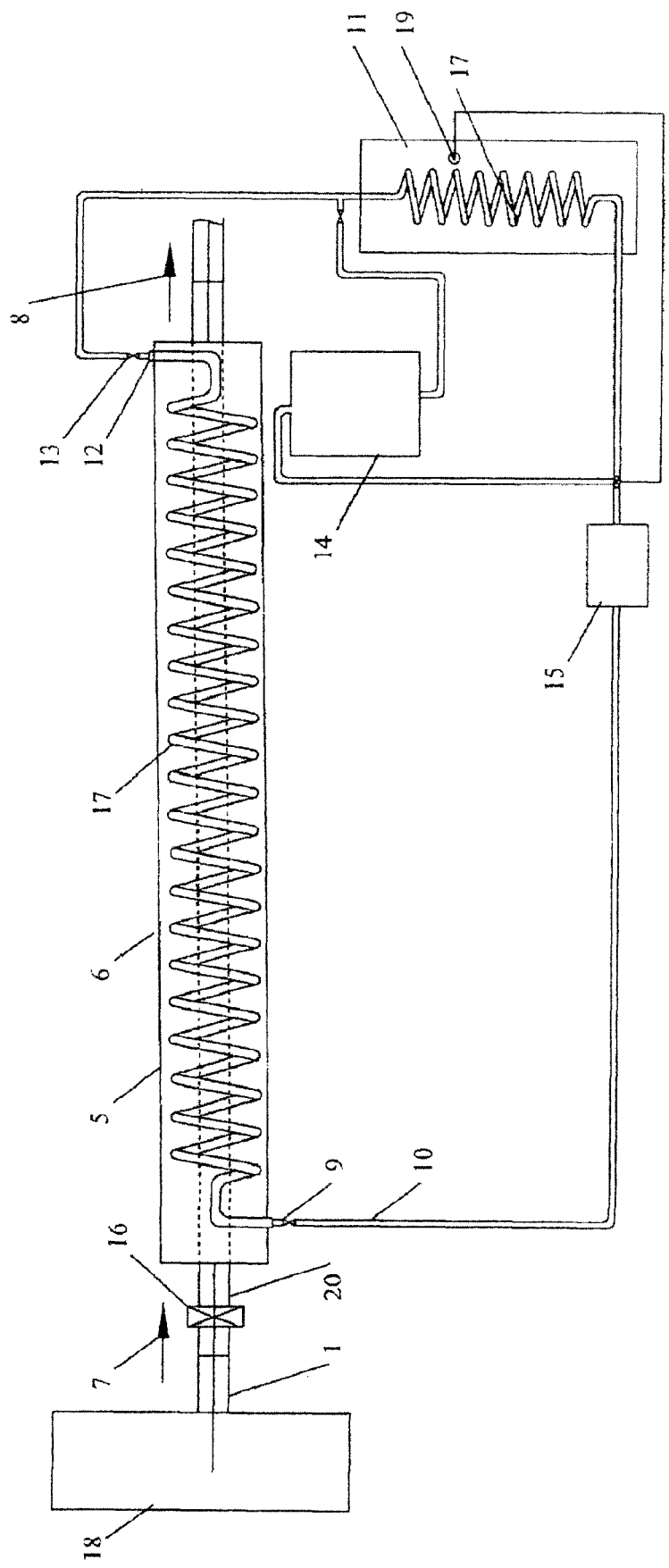
FIG. 3 illustrates another system view used in the implementation of the invention.

FIG. 3 depicts another exemplary implementation of the subject system wherein heating chamber 5 completely surrounds fuel pipe 1 in one piece. Fuel pipe 1 extends out from both ends of heating chamber 5. Heating chamber 5 can be mounted into the system by disconnecting or cutting out a portion of the fuel pipe 1, e.g., as it exits the pressure decreasing station before reaching the combustion chamber. Heating chamber 5 is mounted by reconnecting fuel pipe 10, e.g. by welding at section 20.

FIG. 3 further shows an alternate arrangement for the heat transfer fluid pipe as it traverses heating chamber 5. In this configuration, a spiral heating pipe which contains the heat transfer liquid is wound around fuel pipe 1 within heating chamber 5. One end 17 of this wound section of pipe is connected to the heat transfer fluid intake 12 and the other is connected to the heat transfer fluid drain 9. In this implementation, the fluid in the spiral pipe transfers heat to the incoming fuel. Furthermore, valve 16 can be implemented to regulate the pressure so that it does not exceed the system's mechanical-strength and to impede backflow.

Figure 4:
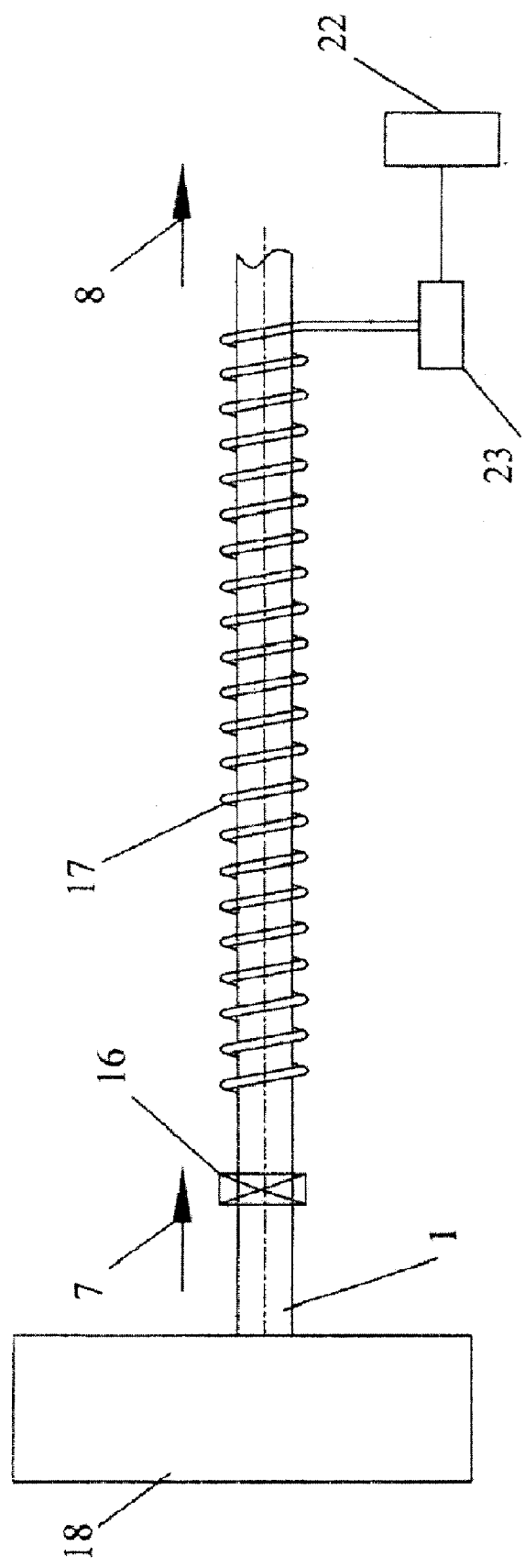
FIG. 4 illustrates a system view implemented with an alternative heat source.

FIG. 4 shows another exemplary embodiment of the above invention wherein an alternate source of heat 22 is used to heat the heat transfer fluid before it enters the spiral heating pipe 23 and thereafter the heating chamber 5. This configuration can be used in place of the system described above or along side. In one embodiment, the alternate heat source 22 is used to heat the heat transfer fluid when the system is first started up. The alternate energy source can comprise any appropriate system that can supply energy, e.g., an electric source, thermal source, solar source, energy supplied from another combustion system operating nearby, or the like. As the exhaust temperature reaches a sufficient level, the system can begin to recycle heat from the exhaust chimney 11. The alternate energy source can then be turned off if appropriate. The alternate energy source can also be configured and adapted to supply additional heat if the temperature of the heat transfer fluid becomes too low to sufficiently preheat the fuel entering the combustion chamber.

Figure 5:
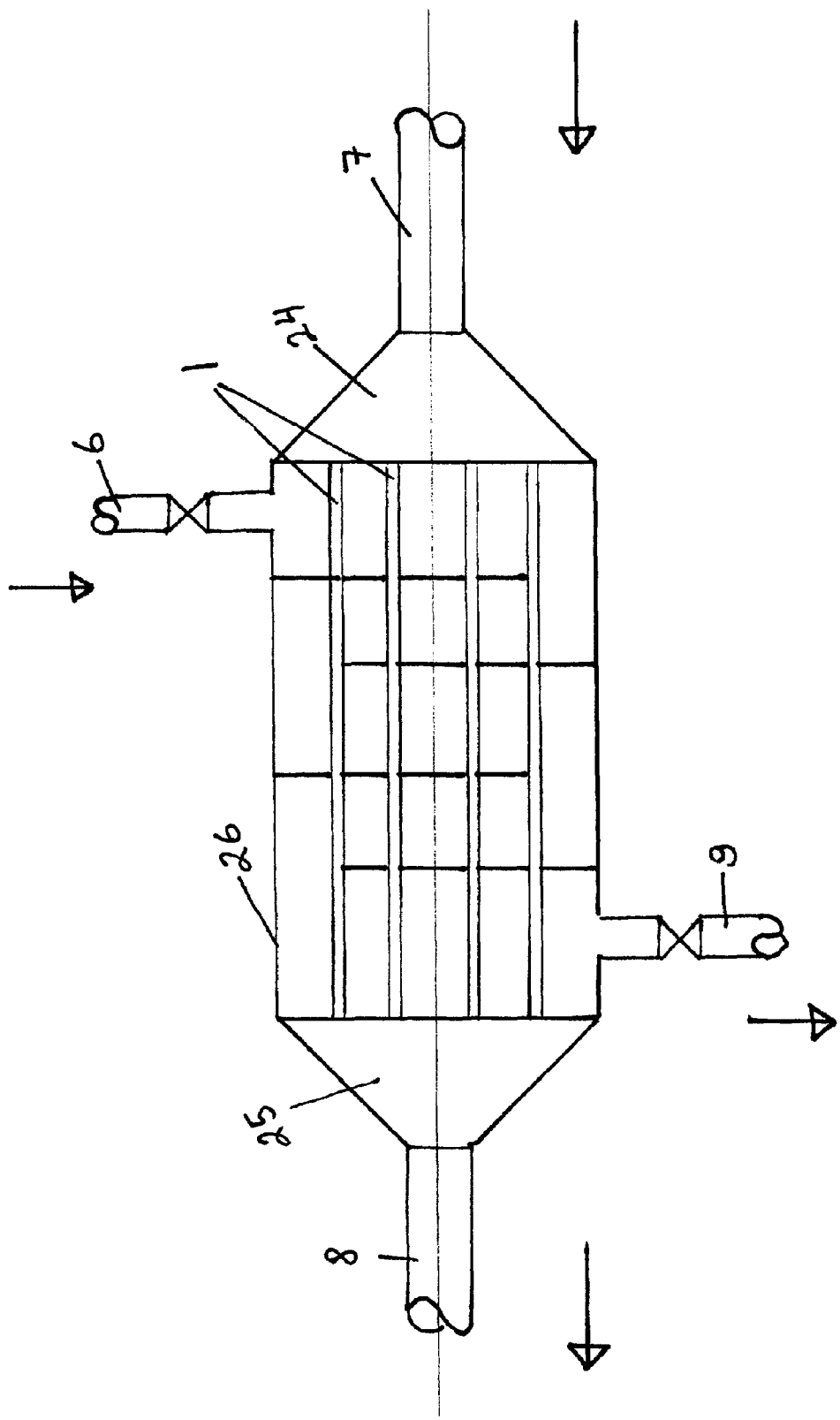
FIG. 5 illustrates an alternative gas flow device.

In another exemplary embodiment, shown in FIG. 5, an alternative configuration is used for the fuel pipe. The internal baffles in the pipe section 26 facilitate mixing of the fuel as it flows through pipe, thereby facilitating even heating of the fuel stream. Entrance 24 and exit 25 comprise conical body connections. The structures can also be microstructures placed with fuel pipe 1 as shown above.

A variety of fluids can be used as the heat transfer fluid of the invention. In some embodiments, the heat transfer fluid can be heated and used for heat transfer up to the desired input temperature of the fuel into the combustion chamber. The fluids can also be chosen to maintain operable form and flow characteristics up to their boiling points. The fluid can comprise a gas, e.g., air or steam, or comprise a liquid, e.g., water or oil. In some embodiments, the heat transfer fluid is maintained in one phase as it circulates through the system. In some embodiments, the heat transfer fluid undergoes a phase shift as it is heated and cooled. In a non-limiting example, the heat transfer fluid could comprise liquid water, steam, or a combination thereof. For example, the fluid may consist essentially of a gas phase as it exits heated from exhaust chimney 11 but comprise a liquid as it exits cooled from heating chamber 5.

Gases that can be used to transfer heat include without limitation air, hydrogen, inert gases, helium, nitrogen, carbon dioxide, sulfur hexafluoride and steam. Liquids that can be used to transfer heat include without limitation water, highly pure deionized water, heavy water, antifreeze (e.g., water carrying an organic chemical such as ethylene glycol, diethylene glycol, or propylene glycol), betaine, polyalkylene glycol and oils. Oils are often used when water is not suitable, e.g., at temperatures above the boiling point of water (i.e., 100° C. at atmospheric pressure). Appropriate oils include without limitation mineral oils, castor oil, silicone oil, fluorocarbon oils, and transformer oil. These oils often have high boiling points and can be used in industrial processes. Nanofluids, e.g., fluids such as those above containing nanoparticle additives, can also be used.

In some embodiments, the heat transfer liquids used in the exemplary implementations herein comprise oil. In some embodiments, the oils comprise mineral oil. Mineral oil or liquid petroleum is a by-product in the distillation of petroleum to produce gasoline and other petroleum based products from crude oil. It is a transparent, colorless oil typically comprised of alkanes (typically 15 to 40 carbons) and cyclic paraffins. Three basic classes of refined mineral oils include: 1) paraffinic oils, based on n-alkanes; 2) naphthenic oils, based on cycloalkanes; and 3) aromatic oils, based on aromatic hydrocarbons.

In some embodiments, the heat transfer oil comprises paraffin oil with general formula: $CH_2$—$CH_2$—$CH_2$—$CH_2$ . . . . In some embodiments, the carbon chain comprises between $C_{12}$ and $C_{40}$, e.g., between $C_{12}$ and $C_{16}$. The latter paraffin oils are described by the formula $C_{12}H_{26}$—$C_{16}H_{34}$.

The fuel savings provided by the system will depend on the type of fuel, type of combustion chamber, feasibility of retrofitting a fuel burning system, available heat to supply to the fuel, and numerous other factors. In some embodiments, the systems can achieve fuel savings of at least about 1%, 2%, 3%, 4%, 5%, 6%, 7%, 8%, 9%, 10%, 12%, 15%, 20%, 25%, 30%, 35%, 40%, 45%, 50%, 55%, 60%, 65%, 70%, 75%, 80%, 90%, or at least about 95%. The reduction in fuel usage to produce the same amount of energy can be at least about 1%, 2%, 3%, 4%, 5%, 6%, 7%, 8%, 9%, 10%, 12%, 15%, 20%, 25%, 30%, 35%, 40%, 45%, 50%, 55%, 60%, 65%, 70%, 75%, 80%, or at least about 90%. In some embodiments, the reduction in fuel usage is at least about 90%.

One of skill will appreciate that other methods can be combined with the systems of the invention to provide further increases in fuel efficiency. For example, as noted herein, some or all of the combustion air entering the combustion chamber can be preheated. Heat from the exhaust or an additional heat source could be used to heat the combustion air. In some embodiments, the combustion air and fuel are mixed and then heated before entering the combustion chamber. The combustion air heating may however lead to increased noxious emissions from the exhaust. In addition, adjustments to the air/fuel ratio entering the burner, e.g., by increasing the air/fuel ratio, can provide additional fuel savings. In some embodiments, increasing the air/fuel ratio can provide at least about a 1%, 2%, 3%, 4%, 5%, 6%, 7%, 8%, 9%, 10%, 12%, 15%, 20%, 25%, 30%, 35%, 40%, 45%, 50%, 55%, 60%, 65%, 70%, 75%, 80%, 90%, 95%, or 100% additional increase in fuel efficiency. In some embodiments, it was observed that the fuel savings provided by the invention increased with the molecular weight of a gas fuel. That is if higher molecular weight gases are burned even high percentage of savings are obtained.

Figure 6:
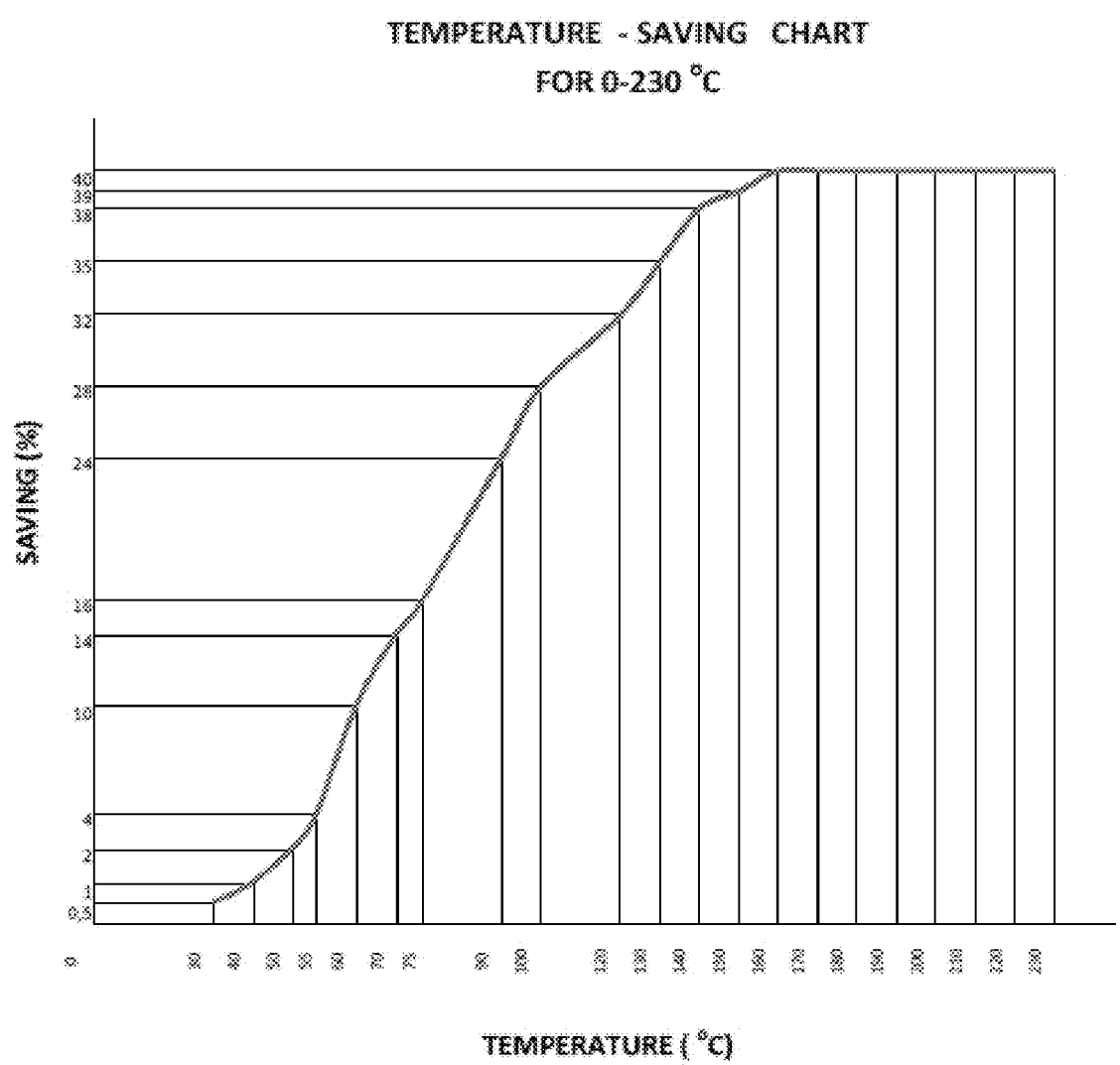
FIG. 6 illustrates fuel savings versus temperature using a Riello RS 300 800/M BLU Series Low NOx Modulating Gas Burners. The Y-axis shows the input temperature of the preheated natural gas to the burner. The X-axis shows the fuel saving realized.

FIG. 6 shows results obtained by implementing a preheating system of the invention to retrofit a Riello RS 300 800/M BLU Series Low NOx Modulating Gas Burners system. Natural gas feed to the burner was preheated using heat reclaimed from the exhaust chimney using a liquid heat transfer oil comprising $C_{12}H_{26}$—$C_{16}H_{34}$. The system was constructed and arranged as described herein. As shown in FIG. 6, fuel savings of about 40% were realized as the input temperature of the fuel into the burner was increased from 30° C. to 200° C. During these experiments, it was further observed that the time to produce a certain energy out of the system decreased significantly, which resulted in the faster production of steam.

One of skill in the art will appreciate that the various components of the system can be constructed and arranged to suit a variety of different scenarios. For example, the heating chamber can be constructed and arranged to adapt to retrofit a preexisting energy producing system. Various embodiments of the heating chamber are described herein and these and other designs can be adapted as appropriate. Similarly, the manner in which the heat transfer fluid exchanges heat with the exhaust can be depend on the particular system. In some embodiments, heat transfer fluid pipe 10 is placed directly within the exhaust flue. In other embodiments, heat is exchanged indirectly with the exhaust. One of skill will appreciate that the modular design of the system lends itself to these and other modifications.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system comprising:
   a volume increasing station that reduces the pressure of a fuel;
   a heating chamber separate from, downstream of, and fluidically connected to the volume increasing station, wherein the heating chamber is configured and arranged to receive the fuel from the volume increasing station, and wherein the heating chamber is configured and arranged to heat the fuel;
   a combustion chamber fluidically connected to the heating chamber,
   wherein the combustion chamber is configured and arranged to receive the fuel heated in the heating chamber and to combust the fuel therein; and
   a heat exchange element, wherein the heat exchange element is configured to transfer exhaust heat generated by the combustion chamber to the heating chamber.

2. The system of claim 1, wherein the system is configured and arranged such that a portion of the fuel is not preheated before entering the combustion chamber.

3. The system of claim 1, further comprising an exhaust chimney in fluidic communication with the combustion chamber.

4. The system of claim 3, wherein the temperature inside the exhaust chimney is monitored.

5. The system of claim 1, wherein the fuel entering the system comprises a gasoline, jet fuel, natural gas, liquefied petroleum gas (LPG), liquefied natural gas (LNG), compressed natural gas (CNG), naphtha, propane, diesel, heating oil, kerosene, fuel oil, distillate fuel oil, diesel fuel oil, light fuel oil, residual fuel oil, heavy fuel oil, gasoil, bunker fuel, alcohol fuel, E85, ethanol fuel, ethanol fuel mixtures, biodiesel, biogas, or a combination thereof.

6. The system of claim 5, wherein the fuel comprises natural gas, liquefied petroleum gas (LPG), liquefied natural gas (LNG), or compressed natural gas (CNG).

7. The system of claim 1, wherein the system is configured and arranged to be retrofit to a preexisting fuel burning system.

8. The system of claim 1, wherein the system comprises a valve to regulate the pressure of the fuel and/or impede a back flow of the fuel.

9. The system of claim 1, wherein at least a portion of a combustion air is preheated before entering the combustion chamber.

10. The system of claim 1, wherein the fuel is heated by an additional heat source.

11. The system of claim 10, wherein the additional heat source comprises electrical energy, solar energy, hot steam, hot liquid, or combinations thereof.

12. The system of claim 1, wherein the system comprises one or more of a Britalus rotary engine, Coomber rotary engine, free-piston engine, gas turbine, aeroderivative, turbo-jet, jet engine, auxiliary power unit, industrial gas turbine, turboshaft engine, radial gas turbine, micro-jet, microturbine, external combustion engine, rotary turbine, internal combustion engine, Internally Radiating Impulse Structure (Iris) engine, turbofan engine, rocket engine, ramjet engine, Minto wheel, orbital engine, Sarich orbital engine, reciprocating engine, piston engine, quasiturbine engine (Quirbines), pistonless rotary engine, rotary combustion engine, RotationsKolbenMaschinen (RKM) engine, Trochilic engine, Engineair engine, Rand cam engine, Atkinson cycle engine, liquid-piston engine, Gerotor engine, split-single engine (twingles), steam engine, reciprocating steam engine, beam engine, stationary steam engine, boiler, multiple expansion engine, uniflow engine, steam turbine, noncondensing turbine, backpressure turbine, condensing turbine, reheat turbine, extracting turbine, Stirling engine, swing-piston engine, oscillating piston engine, vibratory engine, toroidal engine, Tschudi engine, and a Wankel engine.

13. The system of claim 1, wherein the fuel is heated in the heating chamber by at least 6° C., 10° C., 15° C., 20° C., 25° C., 30° C., 35° C., or at least 40° C.

14. The system of claim 1, wherein the fuel enters the combustion chamber at least 5° C., 10° C., 15° C., 20° C., 25° C., 30° C., 35° C., or at least 40° C.

15. The system of claim 1, wherein the fuel savings provided by the system is at least 5%, 10%, 15%, 20%, 25%, 30%, 35%, or at least 40%.

16. The system of claim 1, wherein the heating chamber comprises a fuel pipe circumscribed in whole or part by the heat exchange element, wherein the fuel pipe receives and flows the fuel through the heating chamber.

17. The system of claim 1, wherein the fuel is liquid fuel.

18. The system of claim 17, wherein, in said volume increasing station, said liquid fuel is vaporized to gaseous fuel.

19. The system of claim 1, wherein said fuel is not mixed with combustion air prior to exiting the heating chamber.

20. The system of claim 1, wherein the heating chamber comprises:
  (i) an inlet for a heat transfer fluid;
  (ii) a pipe constructed and arranged to transport the heat transfer fluid;
  (iii) an outlet for the heat transfer fluid; and
  (iv) a fuel flow pipe constructed and arranged to allow heat exchange between the fuel and the heat transfer fluid.

21. The system of claim 20, further comprising a transfer apparatus to provide positive force to circulate the heat transfer fluid.

22. The system of claim 20, wherein the fuel flow pipe comprises internal baffles.

23. The system of claim 20, wherein the heat transfer fluid comprises a mineral oil of formula $C_{12}H_{26}$—$C_{16}H_{34}$ and the fuel comprises natural gas, liquefied petroleum gas (LPG), liquefied natural gas (LNG), or compressed natural gas (CNG).

24. The system of claim 23, further comprising a pool system constructed and arranged to reduce the flow of the heat transfer fluid to the heating chamber when the fuel supply decreases or when the temperature of the fuel entering the combustion chamber exceeds the desired level.

25. The system of claim 20, wherein the fuel flow pipe is circumscribed in whole or part by the pipe.

26. The system of claim 25, wherein the pipe is of a spiral shape.

27. The system of claim 1, wherein the system is constructed and arranged such that exhaust heat is transferred to the heating chamber using a heat transfer fluid.

28. The system of claim 27, further comprising a transfer apparatus to provide positive force to circulate the heat transfer fluid.

29. The system of claim 27, further comprising a pool system constructed and arranged to reduce the flow of the heat transfer fluid to the heating chamber.

30. The system of claim 29, wherein the system is configured to engage the pool system to reduce the flow of the heat transfer fluid to the heating chamber when the fuel supply decreases or when the temperature of the fuel entering the combustion chamber exceeds the desired level.

31. The system of claim 27, wherein the heat transfer fluid comprises a gas phase.

32. The system of claim 31, wherein the gas phase heat transfer fluid comprises air, hydrogen, inert gases, helium, nitrogen, carbon dioxide, sulfur hexafluoride, steam or a combination thereof.

33. The system of claim 27, wherein the heat transfer fluid comprises a liquid phase.

34. The system of claim 33, wherein the liquid phase heat transfer fluid comprises water, highly pure deionized water, heavy water, antifreeze, ethylene glycol, diethylene glycol, or propylene glycol, betaine, polyalkylene glycol, oil, mineral oil, castor oil, silicone oil, fluorocarbon oil, transformer oil, nanofluids or a combination thereof.

35. The system of claim 34, wherein the heat transfer fluid comprises a mineral oil.

36. The system of claim 35, wherein the heat transfer fluid comprises a paraffin mineral oil of formula $C_{12}H_{26}$—$C_{16}H_{34}$.

37. The system of claim 27, wherein the heating chamber comprises:
  (a) an inlet for the heat transfer fluid;
  (b) a pipe constructed and arranged to transport the heat transfer fluid;
  (c) an outlet for the heat transfer fluid; and
  (d) a fuel flow pipe constructed and arranged to allow heat exchange between the fuel and the heat transfer fluid.

38. The system of claim 37, wherein the heating chamber comprises a cylindrical, triangular prism, or rectangular prism shape.

39. The system of claim 37, wherein the heat transfer fluid flows through a spiral heating pipe inside the heating chamber.

40. The system of claim 37, wherein the heating chamber comprises a fuel flow pipe having internal baffles.

41. The system of claim 37, wherein the fuel flow pipe is circumscribed in whole or in part by the pipe.

42. The system of claim 41, wherein the pipe is of a spiral shape.

43. A system, comprising:
  a volume increasing station that reduces the pressure of a fuel directed into said volume increasing station;
  a heating chamber separate from, downstream of, and fluidically connected to the volume increasing station, wherein the heating chamber is configured and arranged to receive the fuel from the volume increasing station, wherein the heating chamber is configured and arranged to heat the fuel received from the volume increasing station, and
  wherein said fuel is not mixed with combustion air prior to exiting the heating chamber; and
  a combustion chamber fluidically connected to the heating chamber, wherein the combustion chamber is configured and arranged to receive the fuel heated in the heating chamber and to combust the fuel therein.

44. The system of claim 43, wherein said heating chamber is configured and arranged to heat the fuel with the aid of electrical energy.

45. The system of claim 43, wherein the combustion chamber is configured to combust the fuel with air that is fed into the combustion chamber separate from the fuel.

* * * * *